(12) United States Patent
Wickwire (10) Patent No.: US 7,980,532 B2
(45) Date of Patent: Jul. 19, 2011

(54) VEHICLE LEVELING DEVICE

(75) Inventor: Robert Wickwire, Spring Valley, CA (US)

(73) Assignee: Valterra Products, Inc., Mission Hills, CA (US)

( * ) Notice: Subject to any disclaimer, the term of this patent is extended or adjusted under 35 U.S.C. 154(b) by 334 days.

(21) Appl. No.: 12/384,157

(22) Filed: Apr. 2, 2009

(65) Prior Publication Data

US 2010/0252788 A1 Oct. 7, 2010

(51) Int. Cl.
*B66F 7/24* (2006.01)
*B60T 3/00* (2006.01)

(52) U.S. Cl. ......................................................... 254/88

(58) Field of Classification Search .................... 254/88; 14/71.5; D34/38; D12/217
See application file for complete search history.

(56) References Cited

U.S. PATENT DOCUMENTS

| | | | |
|---|---|---|---|
| 3,162,973 A | 12/1964 | Christiansen | |
| 3,487,579 A | 1/1970 | Brettingen | |
| 4,026,086 A | 5/1977 | Langley | |
| 4,165,862 A | 8/1979 | Bennett | |
| 4,386,501 A | 6/1983 | Jaeger | |
| 4,427,179 A | 1/1984 | Price | |
| 4,606,732 A | 8/1986 | Lyman | |
| 4,744,780 A | 5/1988 | Volpe | |
| 4,819,910 A | 4/1989 | Johnston | |
| 5,458,315 A * | 10/1995 | Blatz et al. ....................... | 254/88 |
| 5,863,026 A * | 1/1999 | Gano et al. ....................... | 254/88 |
| D426,933 S * | 6/2000 | Redfern .......................... | D34/38 |
| 6,439,543 B1 * | 8/2002 | Peckham ......................... | 254/88 |
| 6,752,381 B2 * | 6/2004 | Colak et al. ..................... | 254/88 |
| 7,040,603 B1 * | 5/2006 | Tai .................................. | 254/88 |
| 7,416,166 B1 * | 8/2008 | Shaw .............................. | 254/88 |
| 2003/0146422 A1 * | 8/2003 | Funk et al. ...................... | 254/88 |
| 2004/0183056 A1 * | 9/2004 | Funk et al. ...................... | 254/88 |
| 2010/0252788 A1 * | 10/2010 | Wickwire ....................... | 254/88 |

\* cited by examiner

*Primary Examiner* — Lee D Wilson
(74) *Attorney, Agent, or Firm* — Beaumont Gitlin Tashjian; Larry F. Gitlin, Esq.

(57) ABSTRACT

A leveling device for vehicle wheels comprising a first integral planar member for mating with one or more additional integral planar members of substantially the same shape and dimension in releasable relationship. All integral members have four sides and an upper surface divided into a plurality of vertically projecting rows of pins with a row of projections situated up front. The bottom surface of each of the integral planar members include rows of sockets, each of which is conformable in shape and size to receive an individual pin in releasable frictional engagement. Each planar member also includes one partially beveled side with a sloped projection with one or more openings conformable to the shape and dimensions of the individual pins. Two or more integral planar members are adapted to stack one upon the other by mating pins and sockets of respective planar members so that the sloped projections overlap one another and are positioned in parallel relation. The sloped projections of stacked planar members may also be disposed in a laterally offset relation. Both embodiments enable substantial alignment of the inclined planes to facilitate movement of a vehicle wheel up on to the surface of the device and back down.

11 Claims, 7 Drawing Sheets

VEHICLE LEVELING DEVICE

BACKGROUND OF THE INVENTION

1. Field of the Invention

This invention relates generally to the field of leveling vehicles and more particularly to a device that is installed under the wheels of a recreational vehicle to level the vehicle when the vehicle is parked.

2. Description of the Prior Art

Vehicle leveling devices, particularly devices that are used to level the wheels of recreational vehicles, are common in the prior art. Usually fabricated of plastic or some other type of sturdy synthetic or resilient material, leveling devices can be employed as a single unit or as two or more units that are combined by stacking to achieve a desired height. Two or more such leveling units may be connected in a variety of ways, including mating pins and pockets similar to the system used with the popular LEGO® building blocks. Examples of this kind of system are disclosed in U.S. Pat. No. 4,744,780 of Leo S. Volpe issued May 17, 1988 and U.S. Pat. No. 4,606,732 of Ronald Lyman issued Aug. 19, 1986. Other types of leveling devices in the prior art include those disclosed in U.S. Pat. No. 4,165,862 issued Aug. 28, 1979 to Stephen A. Bennett; U.S. Pat. No. 4,836,501 issued Jun. 6, 1989 to William F. Baer; U.S. Pat. No. 4,819,910 issued Apr. 11, 1989 to Paul F. Johnston; and U.S. Pat. No. 4,427,179 issued Jan. 24, 1984 to Franklin W. Price. Though these devices have similar objectives, all are structurally distinct from the improved device of the present invention.

Some of the upstanding elements in the prior art devices, or posts or pins as they are commonly called, are solid in structure having no openings either along their sides or upon their top surfaces. Some pins contain openings, either simply for aesthetic purposes or to eliminate the suction effect that might otherwise make it difficult to separate connected units that employ, for example, the aforementioned pin and pocket technology.

In virtually all instances in the prior art, each leveling device unit has a height of about an inch or two, making it especially difficult in some situations for a vehicle wheel to be moved up and eventually onto the top surface of the unit or, in an even more challenging scenario, onto the top surface of two or more stacked units. The greater the height of the stacked leveling units, the more difficult this process becomes.

The improvement of the device of the present invention is a leveling unit that includes a partially beveled side with a sloped or ramp-like projection having an inclined plane that tapers downwardly from the top surface of the unit towards the ground surface. Thus, with a single leveling unit or two or more stacked units, it becomes much easier for the vehicle wheel to move up the ramp to the top surface of the unit, and then down the ramp to the ground surface. Openings formed in the ramp portion of the unit enable the top unit of two or more stacked units to lock together to form laterally offsetting ramps. With the ramps of stacked units positioned in a laterally offsetting relationship, a wheel can more easily ride up and down to reach or descend from the uppermost surface in the stack. No other leveling device in the prior art includes these structural capabilities.

SUMMARY OF THE INVENTION

The device of the present invention provides a leveling apparatus for vehicle wheels comprising a first integral planar member for mating with one or more additional integral planar members of substantially the same shape and dimension in releasable relationship. All integral members have four sides and an upper surface divided into a plurality of rows of vertically projecting pins with a row of these projections up front. The bottom surface of each of the integral planar members includes rows of pocket-like receptacles or sockets. Each socket is conformable in shape and size to receive an individual pin in releasable frictional engagement to enable two or more planar members to interconnect in releasable engagement. Each planar member also includes one partially beveled side with a sloped projection having an inclined plane or ramp with one or more openings conformable to the shape and dimensions of the individual pins that project from the planar member's top surface. Two or more integral planar members are adapted to stack one upon the other by mating pins and sockets of respective planar members so that the sloped projections overlap each other and are positioned in parallel relation. Alternatively, the sloped projection of stacked planar members may be disposed in a laterally offset relation. Both embodiments enable substantial alignment of the inclined planes to facilitate movement of a vehicle wheel up and down the incline of the ramp.

Accordingly, an object of the present invention is to provide an improved leveling device for vehicle wheels for use with a recreational vehicle or the like.

Another object of the present invention is to provide an improved leveling device for vehicle wheels comprising one modular leveling unit for use in facilitating movement of a vehicle wheel up and down the ramp-like projection extending from one side of the unit.

Still another object of the present invention is to provide the improvement comprising two or more stacked modular leveling units with the sloped projections overlapping in parallel relation for facilitating movement of a vehicle wheel up and down the ramp.

Still another object of the present invention is to provide the improvement comprising two or more stacked leveling devices with the sloped projections disposed in a laterally offset relation for facilitating movement of a vehicle wheel up and down the ramp.

Still another object of the present invention is to provide an improved leveling device for vehicle wheels for use in maintaining a recreational or similar kind of vehicle level when the vehicle is parked on an uneven surface.

Still another object of the present invention is to provide an improved leveling device for vehicle wheels that is easy to hold and transport.

Still another object of the present invention is to provide an improved leveling device for vehicle wheels that is easy and efficient to use.

Still another object of the present invention is to provide an improved leveling device for vehicle wheels that is easy and cost-effective to manufacture.

Other objects and advantages of the present invention will become apparent in the following specifications when considered in light of the attached drawings wherein the preferred embodiment of the invention is illustrated.

DETAILED DESCRIPTION OF THE PREFERRED EMBODIMENT

Figure 1:
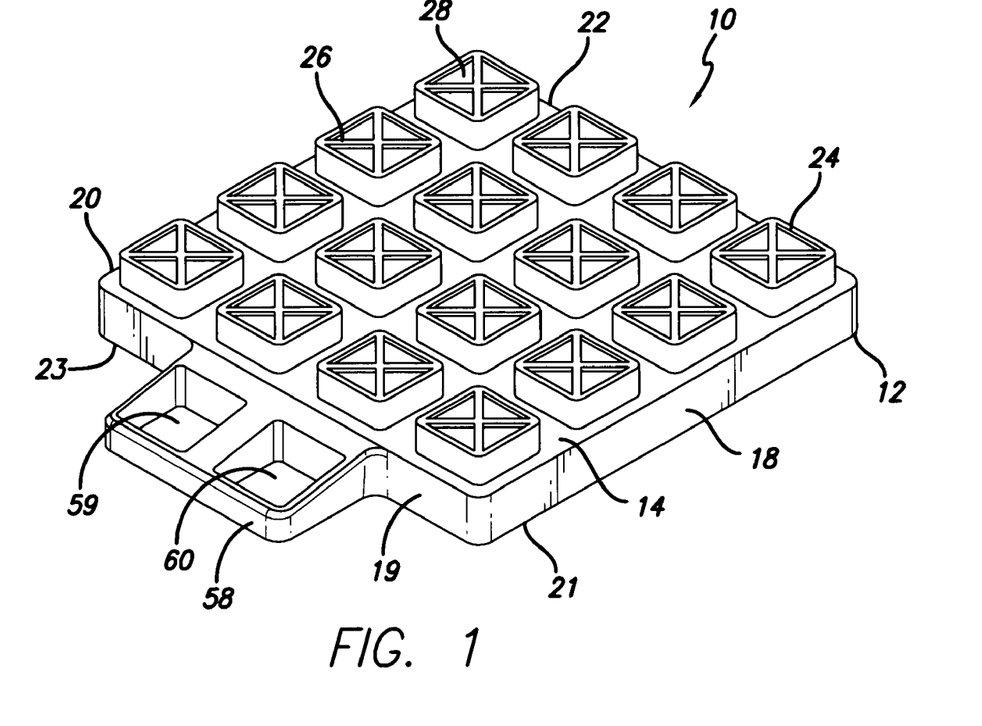
FIG. 1 is a top perspective view of the vehicle wheel leveling device of the present invention.
Figure 2:
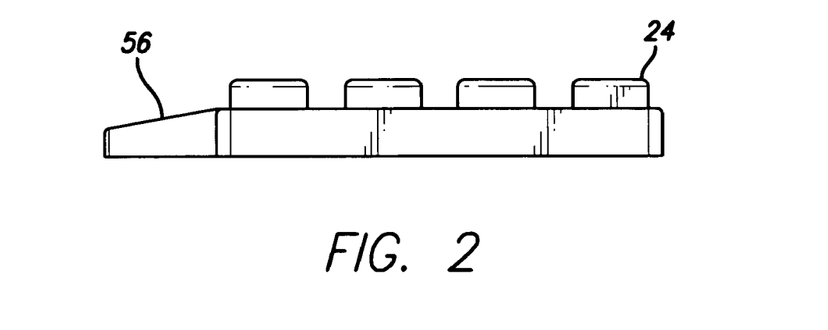
FIG. 2 is a side elevational view of the vehicle wheel leveling device of the present invention.
Figure 3A:
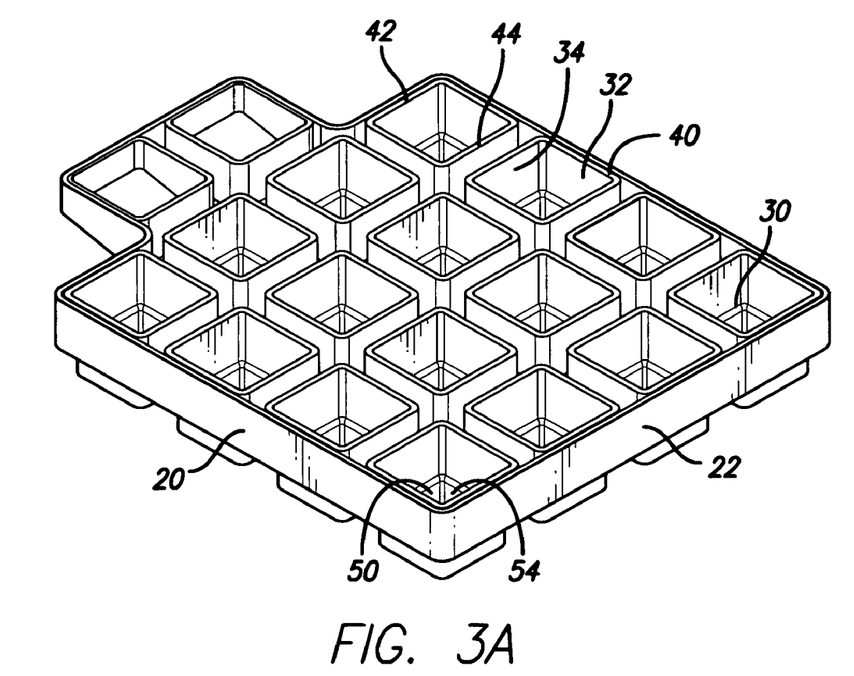
FIG. 3a is a perspective bottom view of the vehicle wheel leveling device of the present invention.
Figure 3B:
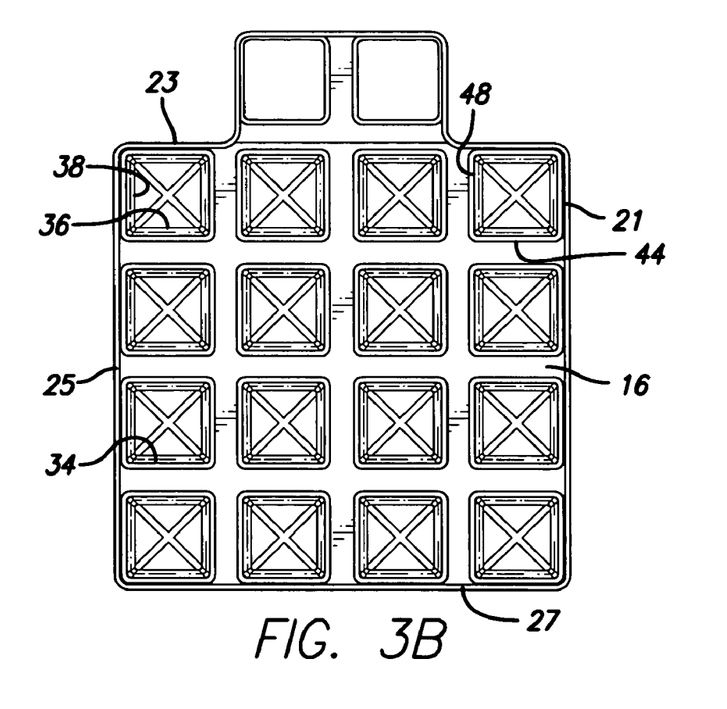
FIG. 3b is a top plan view of the vehicle wheel leveling device of the present invention.
Figure 11:
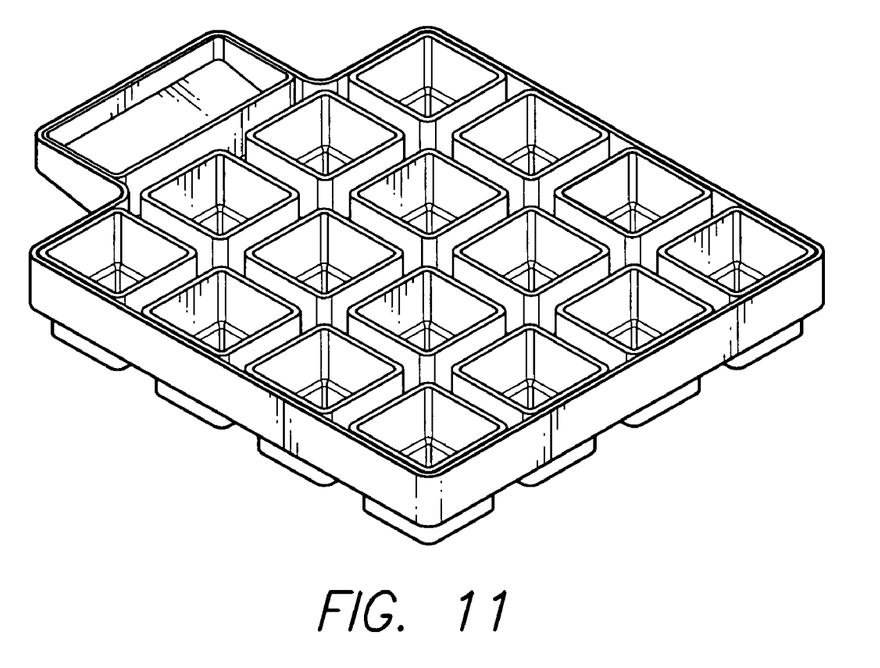
FIG. 11 is a bottom perspective view of the alternative embodiment of the vehicle wheel leveling device of the present invention shown in FIG. 10.
Figure 12:
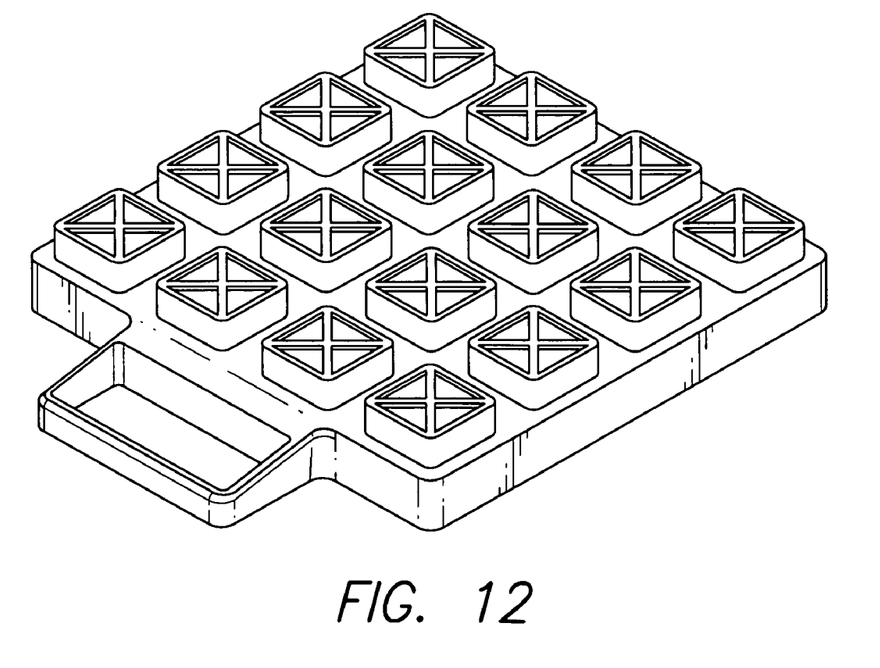
FIG. 12 is a top perspective view of another alternative embodiment of the vehicle wheel leveling device of the present invention.
Figure 13:
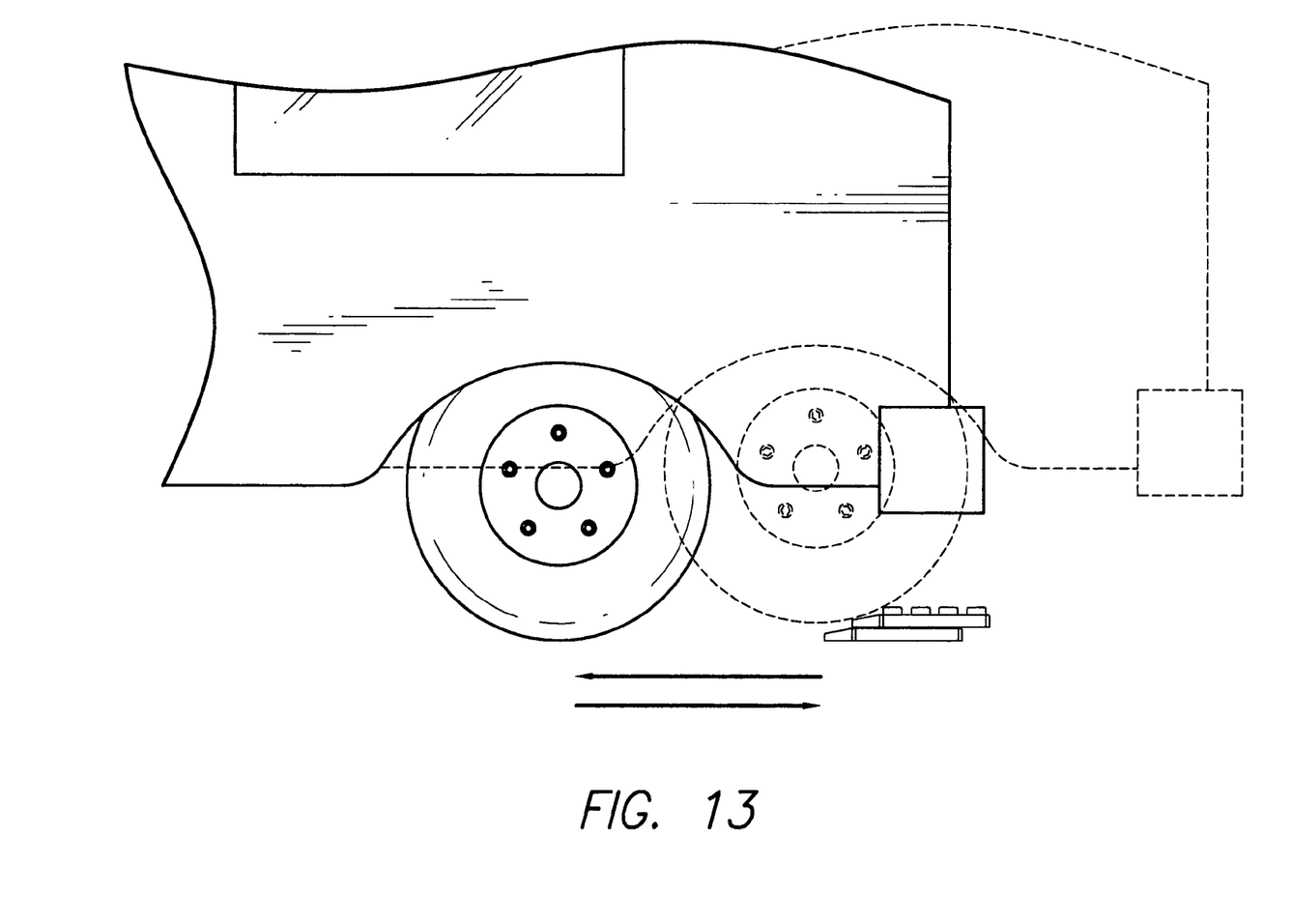
FIG. 13 illustrates the movement of the wheel of a recreational vehicle up and down the incline formed by laterally offset stacked modular units in accordance with the present invention.

FIG. 1 illustrates the preferred embodiment of the present invention, which is designated generally as 10. Device 10, which may be comprised of plastic or some other suitable sturdy synthetic or natural material, is a leveling device employable in a modular fashion for vehicle wheels consisting of a first planar member 12 with a top surface 14 and a bottom surface 16. First planar member 12 also includes integrally formed sides 18, 19, 20 and 22, which, in turn, include respective edges 21, 23, 25 and 27. Formed integrally with top surface 14 are a plurality of pins 24 situated in rows usually, but not limited to, four to a row for a total of sixteen. Each pin 24 projects above surface 14 approximately one-half inch although the height of the pin can be altered to suit any particular set of circumstances and design or structural requirements. Pin 24 typically is square in shape, though there is no requirement that the shape be square. Rectangular, round or oval shaped pins, among a myriad of other alternatives, may also be suitable. Upper surface 26 of pin 24 typically is flat and may be entirely closed or sealed or include on or more openings, such as openings 28. Formed integrally with each pin 24 and extending downward from bottom surface 16 are a plurality of sockets 30, which also conform generally to the shape of pin 24. Each socket 30 includes four integrally formed sidewalls 32, 34, 36 and 38, which include respective edges 40, 42, 44 and 48. Edges 21, 23, 25, and 27 are disposed along the same horizontal plane as edges 40, 42, 44 and 48. Sidewalls 32, 34, 36 and 38, as they extend upwardly, begin to slightly taper inwardly to form respective interior side wall surfaces 49, 50, 52 and 54 of each pin 24. Projecting from one of sides 18,19, 20 or 22 of device 10 is beveled portion 56 with a sloped projection 58 having an inclined plane with one or more sockets 59 and one or more socket openings 60, or a combination of the two. Each socket 59 and socket opening 60 conforms in size and shape to pin 24. Socket openings 61 (FIG. 11) and 63 (FIG. 12) conform in size and shape to two (2) pins 24.

Two or more planar members 12 are adapted as modular units to mate with one another by aligning the rows of sockets 30 of one planar member with corresponding rows of pins 24 of another planar member and bringing the two together to enable the two planar members 12 to join in releasable frictional engagement. Initially, each pin 24 slides easily into its corresponding socket 30. But then, as pin 24 begins to engage the upper interior side walls 48, 50, 52 and 54, which begin to slightly taper inwardly, each pin 24 and its corresponding socket 30 engage one another in a progressively tighter fit. When two planar members 12 are mated in a stacked formation in the manner described herein, sloped projections 58 may be disposed one above the other in parallel relation. Alternatively, when openings 60 of sloped protection 58 of one planar member 12 are aligned with pins 24 along one row, e.g. the first row 62 of pins 24, and one top planar member 12 is brought together with a second planar member 12 to mate, the two sloped projections 58 are disposed in a laterally offset relationship. Thus, the angle of inclination relative to each sloped projection 58 is more gradual than it would be if the two planar members 12 had been disposed one precisely above the other in parallel relation. This arrangement of the laterally offset sloped projections facilitates the movement of a vehicle wheel up and down the ramp.

Figure 10:
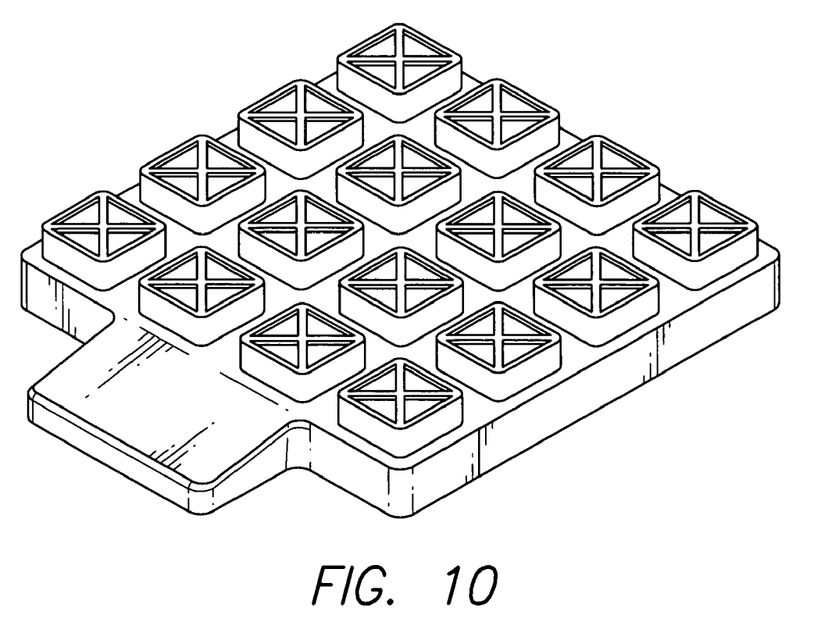
FIG. 10 is a top perspective view of an alternative embodiment of the vehicle wheel leveling device of the present invention.

Sloped projection 58 with or without openings 60 (see e.g. FIG. 10) can be used as a means to hold and transport one of several planar members 12.

Figure 4:
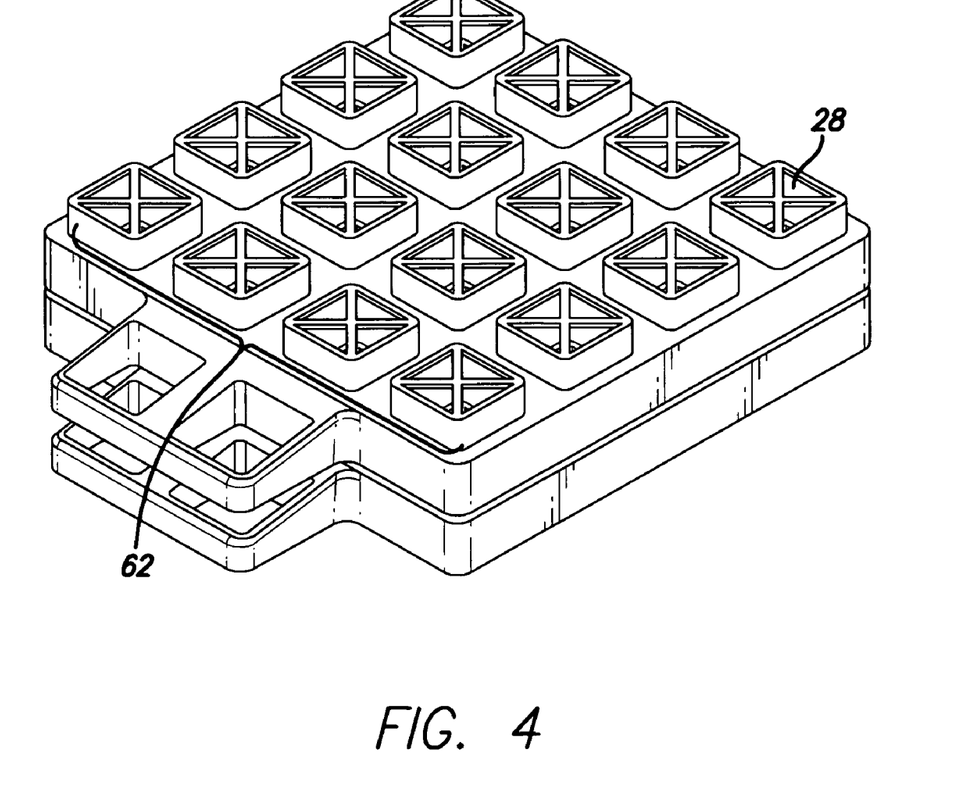
FIG. 4 is a perspective view of a pair of wheel leveling devices of the present invention shown in stacked formation.
Figure 5:
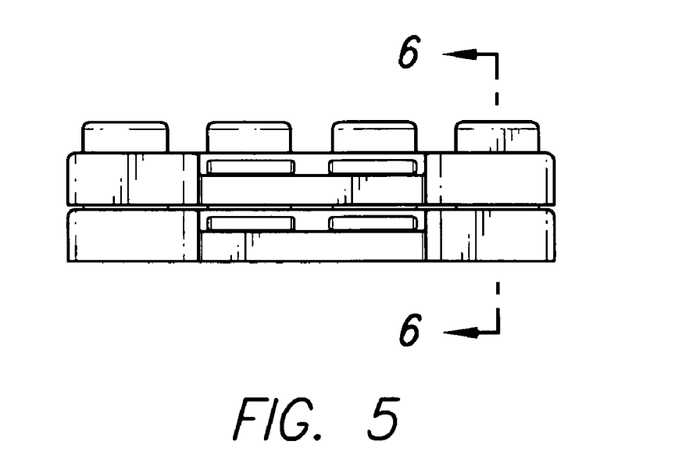
FIG. 5 is a front elevational view of a pair of wheel leveling devices of the present invention shown in stacked formation.
Figure 6:
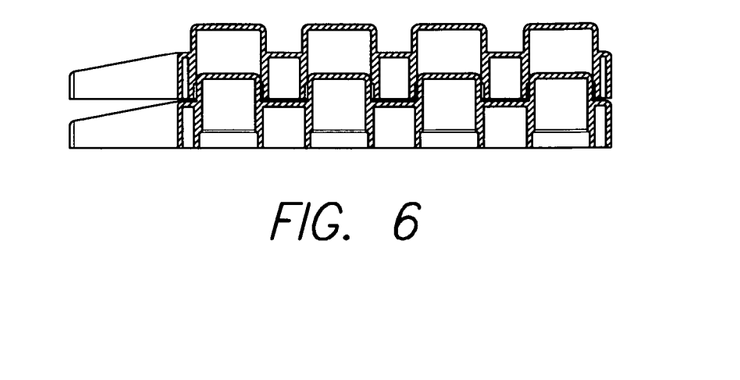
FIG. 6 is a sectional view of the stacked wheel leveling devices of the present invention shown along lines 6-6 of FIG. 5.
Figure 7:
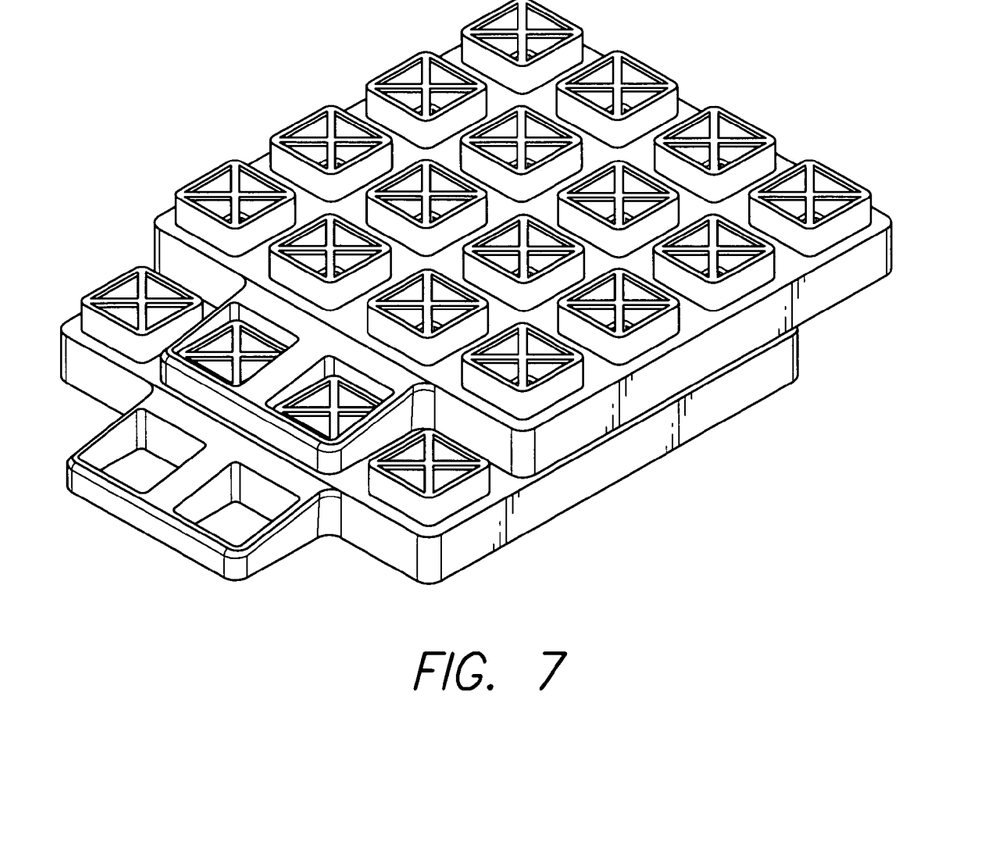
FIG. 7 is a top perspective view of two wheel leveling devices of the present invention shown stacked and laterally offset to reduce the angle of inclination to facilitate movement of a vehicle wheel up and down the indicated incline.
Figures 8, 9:
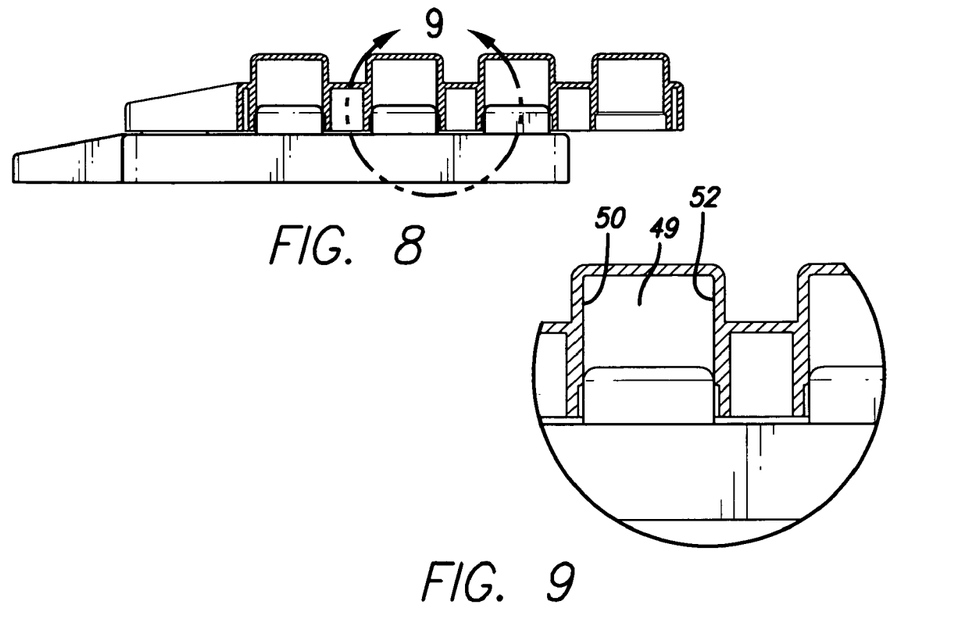
FIG. 8 is a side elevational view of a portion of the wheel leveling devices of the present invention shown in FIG. 7 with the top modular leveler unit shown in cross-section.
FIG. 9 is an enlarged view of a section of the wheel leveling devices of the present invention shown encircled along line 9 of FIG. 8.

Planar members 12, as modular units, may be employed in a variety of combinations to achieve the intended objectives of the present invention. For example, planar members 12 may be placed in a stacked formation (FIG. 4) one upon another or several units stacked three or four high. Planar members 12 may also be combined so that the sloped projections 58, whether positioned in parallel or lateral offset relation (FIG. 7), are placed at opposite ends (not shown) so that a vehicle wheel can be caused to roll up one end and down the other. In a typical application of the present invention, a vehicle wheel will ride up and down only one end where one or more sloped projections 58 are disposed.

Normally, planar member 12 measures eight inches on each side, is an estimated one and one-half inches high from the lowest point, which is defined by edges 21, 23, 25 and 27 of sides 18, 19, 20 and 22, to the highest, which is defined by upper surface 26 of pin 24.

Sloped projection 58 extends one and one-half to one and three-quarter inches from the side, i.e. either side 18,19, 20 or 22, of planar member 12, and has an angle of inclination of approximately 20°. An angle of inclination of less than 45° is preferred to ensure the maximum effectiveness of the device of the present invention.

While the invention will be described in connection with a certain preferred embodiment, it is to be understood that it is not intended to limit the invention to that particular embodiment. Rather, it is intended to cover all alternatives, modifications and equivalents as may be included within the spirit and scope of the invention as defined by the appended claims.

The invention claimed is:

1. A leveling device for vehicle wheels, comprising:
   a first integral planar member for mateably receiving one or more additional integral planar members of substantially the same shape and dimension in releasable relationship, said integral planar member having four sides, an upper surface divided into a plurality of rows of upstanding projections, said rows of upstanding projections having a front row of upstanding projections, and a bottom surface, said bottom surface having a plurality of receptacle openings, each of said openings conformable to receive an individual said upstanding projection, each said receptacle opening and said upstanding projection being adapted in releasable frictional engagement;

said first integral planar member being adapted in releasable engagement with one or more said additional integral planar members, said first integral planar member and each of said adaptable additional integrally planar members having one partially beveled side with a sloped projection having an inclined plane and one or more openings, each of said openings conformable to the shape and dimensions of one said individual upstanding projection and being adapted to mate with an upstanding projection of another said integral planar member to enable substantial alignment of said inclined planes of said joined integral planar members to facilitate movement of a vehicle wheel up and down said inclined planes.

2. The leveling device of claim 1 wherein said openings in said slope projections of one said integral planar member are adapted to mate with said upstanding projections in said front row of said first integral planar member to enable substantial alignment of said inclined planes to facilitate movement of a vehicle wheel up and down said inclined planes.

3. The leveling device of claim 1 wherein each of said upstanding projections has a generally square cross-section and a top surface having one or more openings.

4. The leveling device of claim 1 wherein said sloped projection having one or more openings comprises a means to hold and transport said integral planar member.

5. The leveling device of claim 1 wherein each of said receptacle openings comprises walls with defining bottom edges and each of said openings in said sloped projections comprises walls with defining bottom edges, said bottom edges of said receptacle openings and bottom edges of said openings of said sloped projections being disposed generally along the same plane.

6. The leveling device of claim 1 wherein said sloped projections of two or more said integral planar members are disposed in parallel relation.

7. The leveling device of claim 1 wherein said sloped projections of two or more joined said integral planar members are disposed in a laterally offset relationship.

8. A leveling device for vehicle wheels, comprising:
a first integral planar member for mateably receiving one or more additional integral planar members of substantially the same shape and dimension in releasable relationship, said integral planar member having four sides, an upper surface divided into a plurality of rows of upstanding projections, said rows of upstanding projections having a front row of upstanding projections, and a bottom surface, said bottom surface having a plurality of receptacle openings, each of said openings conformable to receive an individual said upstanding projection, each said receptacle opening and said upstanding projection being adapted in releasable frictional engagement;

said first integral planar member being adapted in releasable engagement with one or more said additional integral planar members, said first integral planar member and each of said adaptable additional integrally planar members having one partially beveled side with a sloped projection having an inclined plane and one or more openings, each of said openings conformable to the shape and dimensions of one or a combination of two of said individual upstanding projections and being adapted to mate with one or a combination of two of said upstanding projections of another said integral planar member to enable substantial alignment of said inclined planes of said joined integral planar members to facilitate movement of a vehicle wheel up and down said inclined planes.

9. The leveling device of claim 8 wherein said sloped projections of two or more said integral planar members are disposed substantially aligned in parallel relation.

10. The leveling device of claim 8 wherein said sloped projections of two or more joined said integral planar members are disposed substantially aligned in a laterally offset relationship.

11. A leveling device for vehicle wheels, comprising:
a first integral planar member for mateably receiving one or more additional integral planar members of substantially the same shape and dimension in releasable relationship, said integral planar member having four sides, an upper surface divided into a plurality of rows of upstanding projections, said rows of upstanding projections having a front row of upstanding projections, and a bottom surface, said bottom surface having a plurality of receptacle openings, each of said openings conformable to receive an individual said upstanding projection, each said receptacle opening and said upstanding projection being adapted in releasable frictional engagement;

said first integral planar member being adapted in releasable engagement with one or more said additional integral planar members, said first integral planar member and each of said adaptable additional integrally planar members having one partially beveled side with a sloped projection having an inclined plane, said sloped projection having a top surface and a socket beneath said top surface for receiving one or a combination of two of said individual upstanding projections and being adapted to mate with one or a combination of two of said upstanding projections of another said integral planar member to enable substantial alignment of said inclined planes of said joined integral planar members to facilitate movement of a vehicle wheel up and down said inclined planes.

* * * * *